2 Sheets—Sheet 1.

M. CAMPBELL.

CURLING IRON.

No. 11,237. Reissued Apr. 26, 1892.

Mark Campbell

Inventor

Witnesses

G. S. Elliott

Rufus P. Clarke

By Dyrenforth & Dyrenforth

Attorneys

THE NORRIS PETERS CO., PHOTO-LITHO., WASHINGTON, D. C.

M. CAMPBELL.

CURLING IRON.

No. 11,237. Reissued Apr. 26, 1892.

Mark Campbell.
Inventor

Witnesses
G. S. Elliott
Rufus P. Clarke

By Dyrenforth and Dyrenforth.
Attorneys

THE NORRIS PETERS CO., PHOTO-LITHO., WASHINGTON, D. C.

UNITED STATES PATENT OFFICE.

MARK CAMPBELL, OF CHICAGO, ILLINOIS.

CURLING-IRON.

SPECIFICATION forming part of Reissued Letters Patent No. 11,237, dated April 26, 1892.

Original No. 463,328, dated November 17, 1891. Application for reissue filed March 12, 1892. Serial No. 424,735.

*To all whom it may concern:*

Be it known that I, MARK CAMPBELL, a citizen of the United States, residing at Chicago, in the county of Cook and State of Illinois, have invented a new and useful Improvement in Curling-Irons, of which the following is a specification.

My invention relates to an improvement in curling-irons, and has for its object particularly to provide a curling-iron having two or more curling-bars attached to a handle in such manner that they may be readily interchangeable by the simple operation of turning upon a pivot.

In embodying my invention into practical form I have found that several modified constructions presenting noticeable differences in some regards offer substantially equal advantages; but the essential advantage in all instances is found to lie in a single feature—namely, the provision on a single bar or rod of two or more curling-bars and a gripping-finger having a pivotal connection with the rod to operate with either bar, and in this my invention may be said broadly to consist.

My invention consists, further, in a curling-iron involving a rod carrying two curling-bars and pivotally mounted on a handle to permit either curling-bar to be brought into use while the other is covered by the handle or inclosed therein.

My invention consists, further, in certain preferred details relating to the manner of pivoting the curling-bars upon a spring-handle and supporting adjacent to the operative end of the curling-bar the holding-finger common in devices of this nature, and, furthermore, in the preferred manner of constructing the handle to produce an air-space between the curling-bar and the cylindrical hand-hold to relieve the hand from the heat of the curling-bar when in use.

Figure 1:
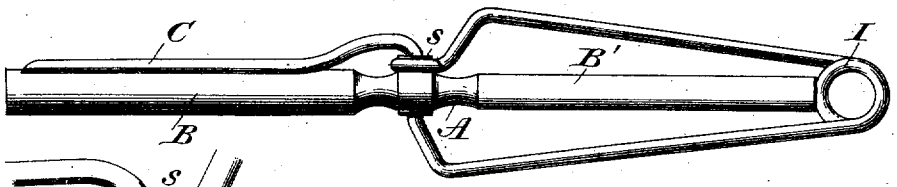
Figure 2:
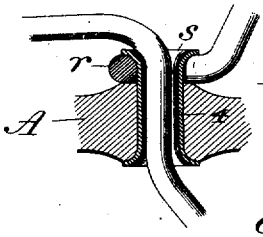
Figure 3:
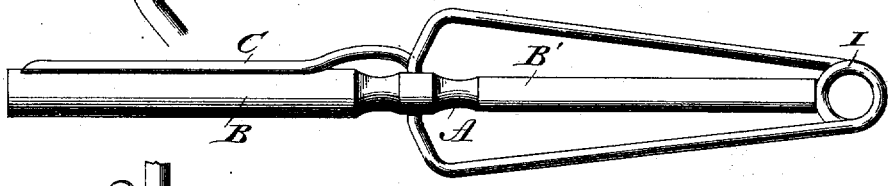
Figure 4:
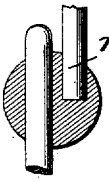
Figure 5:
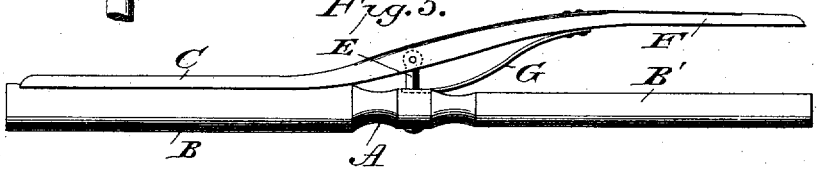
Figure 6:
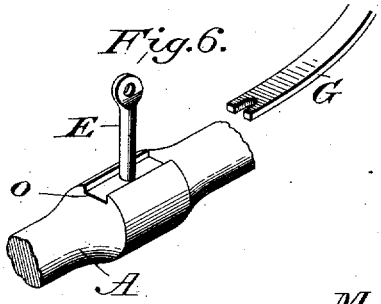
Figure 7:
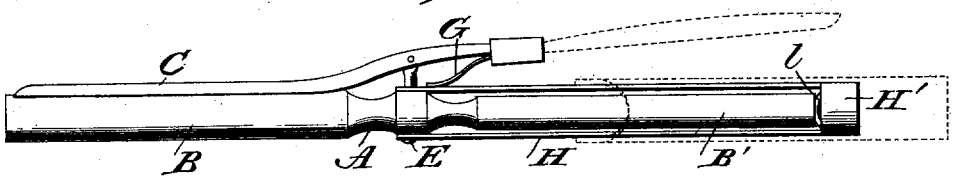
Figure 8:
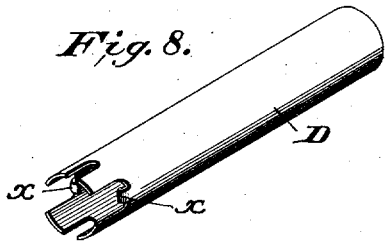
Figure 9:
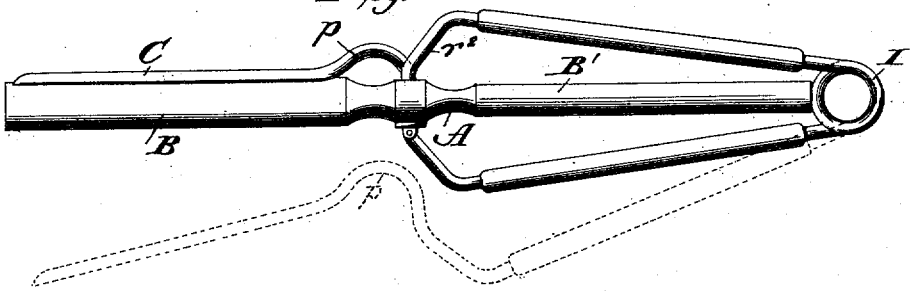
Figure 10:
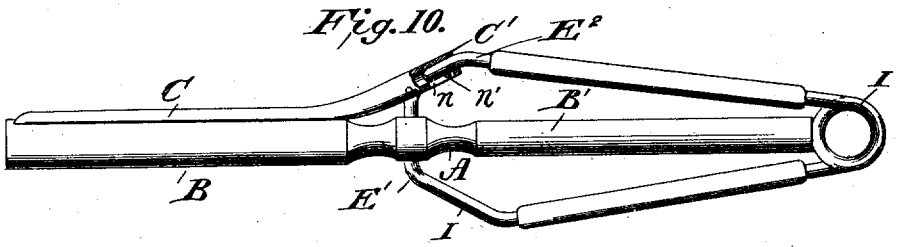

In the drawings, Figure 1 represents a curling-iron constructed in accordance with my invention, the handle and gripping-finger being of wire, and showing two curling-bars upon a common rod, the latter being centrally and pivotally mounted upon one of the wires of the handle. Fig. 2 is a longitudinal sectional view taken through the central part of the rod, showing the manner of mounting the rod upon the handle-wire. Fig. 3 is a view of a modified form of the construction shown in Fig. 1. Fig. 4 is a vertical cross-section through the center of the bar, Fig. 3, to show the manner of mounting the curling-bars on the wire handles. Fig. 5 is a view of a curling-bar, showing the application in the same device of certain features of the construction, coupled with the pivotal feature shown in Figs. 1 and 3. Fig. 6 is a perspective view of the detail comprised in the manner of mounting the gripping-finger upon the curling-bars. Fig. 7 is a view illustrating the same device as that shown in Fig. 5, but provided with an inclosing handle and cylindrical casing therefor and showing the preferred manner of providing the air-space. Fig. 8 is a view in perspective of the inclosing cylindrical case. Fig. 9 is a view of the same device illustrated in Fig. 3, showing how the handle made of wire may be provided with a hand-hold insulated as to the heat. Fig. 10 is a view, partly in section, of a handle involving the essential features of construction found in Figs. 1 and 9.

In all the figures, A represents the central rod, to each end of which is secured permanently or detachably, as may be desired, curling-bars B B′. The curling-bars B B′ differ in their thickness, but are usually of the same length. The gripping-finger C is spring-controlled, as is usual in devices of this nature, and is so mounted as to extend along the full length of the bar B or B′.

In my preferred construction, as illustrated in the drawings, the gripping-finger is connected with the rod A by a pivotal connection formed either by pivotally mounting the rod A upon the wire forming the finger C in a part of its length, as shown in Figs. 1, 2, and 9, or by providing on the finger C a pivot-pin E, passing through an opening formed through the central and larger part of the rod A.

As shown in Figs. 1, 3, and 9 and the detail sectional features in Figs. 2 and 4, the handle of the curling-iron is in the form of a bent spring-wire terminating at one end in a permanent or approximately permanent connection with the rod A and at its other end elongated and bent to produce the spring gripping-finger C.

For the purpose of supporting the rod and curling-bars upon the handle constructed as shown in Figs. 1, 3, and 9 either form shown in Figs. 2 and 4 may be employed.

In the form shown in Fig. 2 a sleeve *t* is introduced through the central part of the rod A, which sleeve is expanded at each end, as shown, and at one side projects out from the rod A, as indicated at *s*, Fig. 2. The length of wire which is continued into the gripping-finger C passes through the sleeve *t* and furnishes the pivot upon which the rod A is revolved. The opposite end of the wire constituting the handle is wound about the sleeve upon the said projection *s*, as indicated at *r*, Fig. 2.

In the construction shown in Fig. 3 the sleeve *t* is omitted, a simple perforation being provided through the enlarged part of the rod A, and the opposite extremity *r'*, Fig. 4, enters and is retained in the central part of the rod A. The rod A is free to revolve both upon the end *r'* and upon the wire which passes through it. The wire passing through the rod serves, as in the case of the construction shown in Fig. 1, to afford the pivot for the rod A; but by reason of the manner of connecting the end of the wire the turning of the rod can only be performed in one direction to cause the end *r'* to pass the gripping-wire C. The spring-like character of the wire adjacent to the end *r'* enables it to pass the pivotal section, which terminates in the gripping-finger.

In the construction shown in Fig. 9 the end $r^2$ of the handle affords the pivot upon which the rod A turns, and the opposite end *p*, which is continued into the gripping-finger C, passes around the rod A and is caused by its spring character to embrace the bars B B', and is assisted in its tendency to assume the proper position by the act of gripping the handle in the operation of the device. In Fig. 9 I have also illustrated the manner of providing the handle with an insulated hand-hold, but lay no claim thereto.

The forms last described, as illustrated in Figs. 1 to 4 and 9, are essentially simple and cheap in their construction; but for many purposes I prefer to amplify the invention by coupling with it the details shown in Figs. 5, 7, and 10, a description of which is as follows:

Figs. 5 and 7 illustrate the same device, the latter figure showing added thereto a handle surrounding the inclosed bar to enable the hand to be kept out of contact with the latter. Instead of causing a part of the gripping-finger C to extend through the rod A, thus providing the pivot therefor, I provide a pivot in the form of a projection E, as before mentioned, which passes through the bar, the spring-finger C being elongated, as shown at F, from which elongated part a flat spring G extends to the rod A, which may be grooved, as shown at *o*, for its reception. The part F affords a handle for the raising of the gripping-finger C from contact with the bars B B', and when thus raised the rod A may be turned on the pivot afforded in the lug E. Straps of thin metal H may be provided to extend from the pivot-pin E and terminate in a short cylinder H', as shown in Fig. 7, between which straps the bars B B' move in their revolution on the pivot E. When using the straps H, it is preferable to have the lower bearing of the spring G against one of the straps, and it is preferable, also, to apply at the end carrying the cylinder H' a cylinder D, of a length sufficient to cover the bar B or B', between which latter and the interior of the cylinder an air-space is afforded, which serves to moderate the heat. To prevent the cylinder D from being entirely withdrawn after being once applied, it may be turned over at one end, as shown at *x x* in Fig. 8.

The form illustrated in Fig. 10 presents many elements of advantage of a character to make it preferable to all the others, and is, in fact, an embodiment of the essential features of the form shown in Figs. 5 and 9. The handle-bar is made of a continuous spring-wire I, surrounded in part of its length by the short cylinders, and one end E' of the wire passes through the central part of the rod A and affords a pivot for the latter. The gripping-finger C is of the general form shown in Fig. 5, but at its inner end terminates in a hollow cylinder C' for the reception of the end $E^2$ of the wire I. An elongated slot *n* is provided to receive the pin *n'*, which prevents the withdrawal of the wire end $E^2$ from the cylinder C', while permitting it to have an in-and-out movement under the manipulation of the gripping-finger. The extremity of the wire I has a pivotal connection with the gripping-finger C, as shown at *m*, thus combining in this device the pivot shown in Figs. 1 and 9 and the pivot shown in Figs. 5 and 6.

In order to cause either bar B or B' to remain in a central position in relation to the handle, I provide in those forms illustrated in Figs. 1, 3, 9, and 10 such a relation between the bent part of the wire and the bar that the latter will engage the former and be held by contact, and in the form shown in Fig. 7 I provide the spring projection *l*, which serves the same purpose. The two or more bars B B' may be of the same or different size and of the same or different shape.

What I claim as new, and desire to secure by Letters Patent, is—

1. In a curling-iron, the combination, with the gripping-finger, of a rod A, carrying at one end a curling-bar of one size and at the other end a curling-bar of different size, and a pivotal connection between the rod and gripping-finger, whereby the latter may be caused to co-operate with either bar, substantially as described.

2. In a curling-iron, the combination, with a rod A, carrying at each end a curling-bar, of a gripping-finger pivotally connected to the rod, whereby it may be caused to co-operate with either bar, substantially as described.

3. In a curling-iron, the combination, with the rod A, carrying at each end a curling-bar, of a gripping-finger C, and a pivotal connection between the gripping-finger and the rod A, substantially as described.

4. In a curling-iron, the combination of the rod A, carrying at each end a curling-bar, a fixed part carrying a gripping-finger C, and a pivotal connection between the fixed part and the rod A, said fixed part constituting a handle extending from the rod A and adapted to receive the bars in their rotation on their pivot, substantially as described.

5. In a curling-iron, the combination, with the rod A, centrally perforated and carrying at each end a curling-bar, of a handle carrying a gripping-finger and affording in part of its length a pivot for the rod, substantially as described.

6. In a curling-iron, the combination, with the rod A, centrally perforated and carrying at each end a curling-bar, of a fixed part constituting a handle provided with a spring and in part of its length affording a pivot for the rod A, and a gripping-finger operated by the spring-handle, substantially as described.

7. A curling-iron comprising, in combination, a central rod A, provided with a perforation, bars B B′, carried by opposite ends of the rod, a spring-handle formed of a single wire I, passing in part of its length through the perforation, a gripping-finger C, carried by the extremity of the introduced part of the wire I, and a connection between the inner end of the finger C and the opposite end $E^2$ of the wire I, the parts being arranged to operate substantially as described.

MARK CAMPBELL.

In presence of—
ALBERT POPKINS,
BRUCE J. ELLIOTT.